Figure 1:
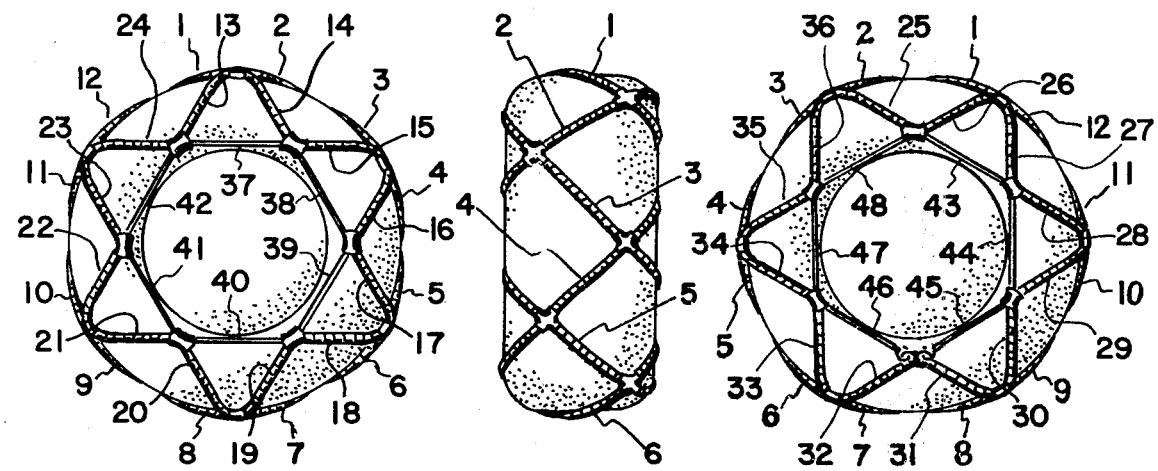

United States Patent [19]
Lew

[11] 4,261,404
[45] Apr. 14, 1981

[54] STRUCTURALLY CONTINUOUS CONTINUOUS SNOW CHAIN

[76] Inventor: Hyok S. Lew, 7890 Oak St., Arvada, Colo. 80005

[21] Appl. No.: 125,555

[22] Filed: Feb. 28, 1980

Related U.S. Application Data

[63] Continuation-in-part of Ser. No. 75,495, Sep. 13, 1979, which is a continuation-in-part of Ser. No. 876,696, Feb. 10, 1978, abandoned.

[51] Int. Cl.³ .............................................. B60C 27/00
[52] U.S. Cl. ................................ 152/221; 152/225 R; 152/241
[58] Field of Search ............... 152/221, 222, 218, 219, 152/225 R, 217, 241

[56] References Cited
U.S. PATENT DOCUMENTS

| | | | |
|---|---|---|---|
| 2,346,477 | 4/1944 | Ederer | 152/221 |
| 2,830,639 | 4/1958 | Clark | 152/239 |
| 2,931,413 | 4/1960 | Randall | 152/219 |
| 3,842,881 | 10/1974 | Muller | 152/217 X |
| 3,934,633 | 1/1976 | Bula | 152/221 |
| 4,111,251 | 9/1978 | Bula | 152/219 |

*Primary Examiner*—William A. Powell
*Assistant Examiner*—Thomas Bokan

[57] ABSTRACT

The present invention is related to a snow chain for the automobile tires employing a traction cord disposed around the tread surface of the tire in a zig-zag pattern, which traction cord is retained in the position by a pair of star-shaped tie cords respectively disposed on each side of the tire and held in position by a pair of retaining cords, respectively. Said snow chain is constructed of one or more pieces of the continuous cords eliminating the need of the splicing of the traction cord.

4 Claims, 8 Drawing Figures

U.S. Patent  Apr. 14, 1981  Sheet 1 of 2  4,261,404

STRUCTURALLY CONTINUOUS CONTINUOUS SNOW CHAIN

SPECIFICATION

This is a continuation-in-part application of a patent application Ser. No. 075,495 entitled "Easy to Install Continuous Snow Chain". which was filed on Sept. 13, 1979 which in turn is a continuation in part application of Ser. No. 876,696 filed on Feb. 10, 1978 now abandoned.

In terms of the performance, the continuous snow chain disclosed in the parent patent application is a perfect snow chain, as it enables the high speed drive on the snow, ice as well as the bare asphalt surface while providing all the traction required to drive under highly adverse road conditions. This inventor has been testing said continuous chain at a speed as high as 60 mph without encountering any vibration or noise detrimental to the driver's emotion, to the tires and car as well as to the road surface. The maximum tension imposed on the traction cord as well as the tie cords retaining said traction cord around the tread surface of the tire in a zig-zag pattern is comparable to a tension required to pull the automobile when the tires undergo a spin. As a consequence, it is important to provide a sufficient strength to each cord segments in constructing the continuous snow chain disclosed in the parent patent application preceding the present application. In structures employing the cords such as the wire ropes with beads threaded on, the major structural weakness is in the splice where two or more ends of the wire ropes are spliced to each other. Therefore, it is important to minimize the splicing joints of the load bearing element in constructing a continuous snow chain disclosed in the parent patent application.

The primary object of the present invention is to provide a continuous snow chain without splicing joints on its load bearing members in its construction.

Another object of the present invention is to provide a continuous snow chain that is easy to install and take off.

A further object of the present invention is to provide a continuous snow chain wherein the pairs of retaining cords are inter connected to each other; whereby, both retaining cords can be tightened by tightening only one retaing cord.

These and other objects of the present invention will become clear as the description and specification of the present invention proceeds. The present invention may be described with greater clarity and specificity by referring to the FIGS. 1 through 8 showing different embodiments of the principles taught by the present invention.

In FIG. 1, there is shown an inside view on the left, front view in the middle and outside view on the right of a continuous snow chain installed on an automobile tire, which continuous snow chain is comprised of (a) a traction cord loop comprising the cord segments 1 through 12 disposed around the tread surface of the tire in a zig-zag pattern (b) a star-shaped inside tie cord loop comprising the cord segments 13 through 24 wherein the outer points of said star-shaped tie cord loop are tied to said traction cord loop at regular interval (c) a star-shaped outside tie cord loop comprising the cord segments 25 through 36 wherein the outer points of said star-shaped tie cord loop are tied to said traction cord loop at regular interval which is staggered to the interval employed for said star-shaped inside tie cord loop (d) an inside retaining cord loop comprising the cord segments 37 through 42 engaging the inner points of said star-shaped inside tie cord loop and (e) the outside retaining cord loop comprising the cord segments 43 through 48 engaging the inner points of said star-shaped outside tie cord loop. Such a continuous snow chain can be constructed in a continuous structure as shown in FIG. 2.

Figure 2:
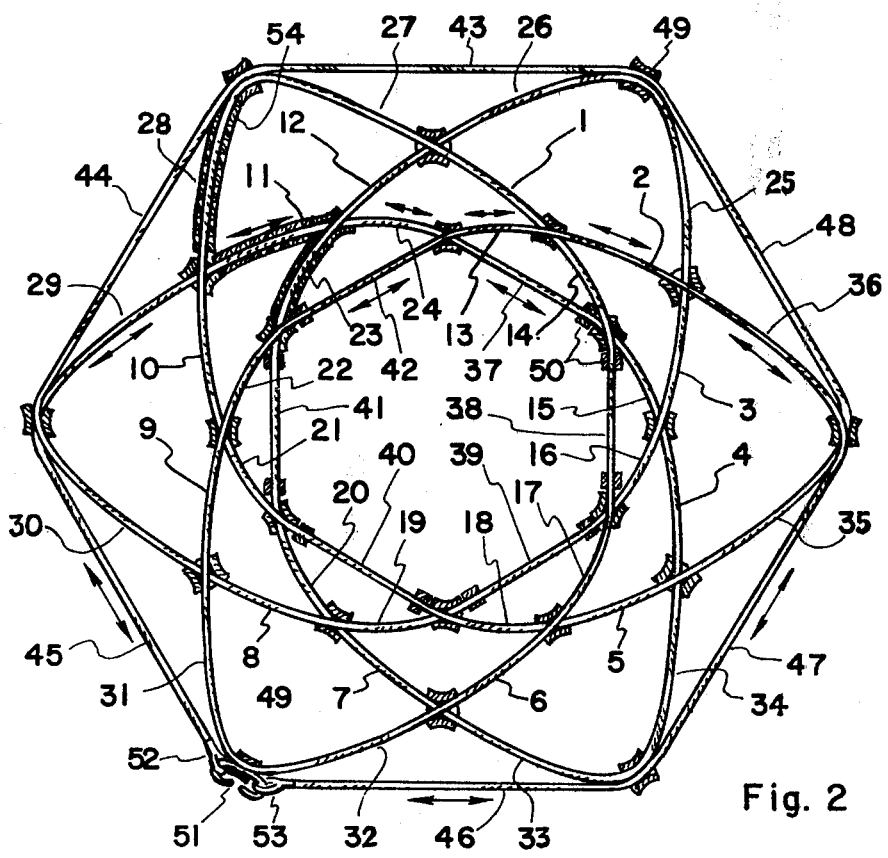

In FIG. 2 there is shown a schematically flattened view of the structurally continuous continuous snow chain illustrated in FIG. 1, which is constructed of a single continuous cord wherein each of the corresponding cord segments between FIGS. 1 and 2 are easily identifiable. It should be understood that the illustration shown in FIG. 2 does not depict the true length of each cord segments, as the illustration shows only the routing of the cord forming the structurally continuous continuous snow chain. The two ends of the single continuous cord forming the structurally continuous continuous snow chain is removably connected to each other by means of eyelets 52 and 53 engaging a hook 51 attached to an inner point of the star-shaped outside tie cord loop where the cord segments 31 and 32 meet. The cord segments in contact with the road surface, i.e., those cords segments constituting the traction cord loop and the pair of star-shaped tie cord loops are threaded with the abrasion resisting beads 54 as representatively illustrated by the cord segments 23, 11 and 28. It should be understood that only about half of the length of the cord segments constituting the pair of star-shaped tie cord loops are actually in contact with the road surface and, consequently, only this half length of such cord segments are required to be protected by those beads, in which case some or all beads must be clamped onto the cord to prevent the beads from sliding and drifting. A plurality of the connecting beads 49 are used to tie the inter crossing cords together joining the inter crossing cords slidably or nonslidably depending on the varying requirement. A plurality of the spacing beads 50 clamped on the cord are employed to maintain the spacing between the connecting beads when required. Of course, such spacing beads are not needed when the connecting beads are clamped on the cords where the nonsliding connection between two cord segments is required. In the illustrative embodiment shown in FIG. 2, those cord segments accompanied by the arrow mark are allowed to slide while the rest of cord segments may be slidably or nonslidably disposed.

The structurally continuous continuous snow chain shown in FIG. 2 can be installed on an automobile tire as shown in FIG. 1 in the following manner: By disengaging the eyelets 52 and 53 from the hook 51 and extending the cords 37 and 42 be feeding the cords 45 and 46 respectively, the inside retaining cord loop comprising the cord segments 37 through 42 is enlarged allowing said inside retaining cord loop to be slipped over the tire. First, the top half of said snow chain is diposed over the top half of the tire. After rolling the tire by 180 degree by moving the automobile, the remaining half of said chain is disposed over the tire which action completes the disposition of the traction cord loop around the tread surface of the tire. The mounting of the said snow chain is completed by pulling the cords 45 and 46 of the outside retaining cord loop and connecting the eyelets 52 and 53 to the hook 51, which action simultaneously reduces the length of both retaining cord loops and create tension on every cord segments constituting the structurally continuous continuous snow chain.

It is obvious that the routing of the continuous cord forming the structurally continuous snow chain can be varied from that shown in FIG. 2. It is further obvious that a single continuous cord can be made of two or more separate cords removably spliced to each other and, consequently, the structurally continuous continuous snow chain shown in FIG. 2 or its variation can be constructed of two or more cords.

Figure 3:
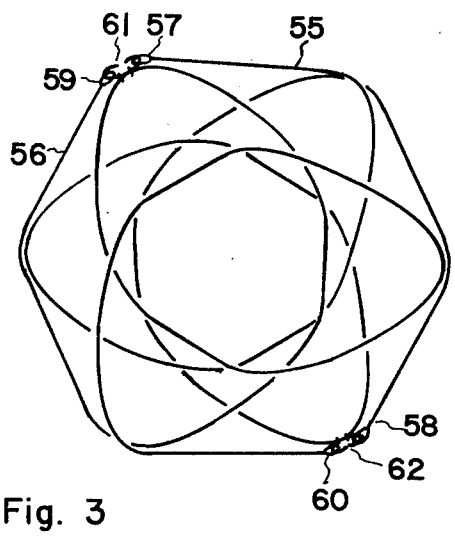

In FIG. 3 there is shown one variation of the structurally continuous continuous snow chain with a traction cord loop employing 12 zig-zag runs, which can be mounted to a tire as shown in FIG. 1. Here said snow chain is constructed of two separate cords 55 and 56. The eyelets 57 and 59 respectively attached to one ends of said two cords engage a hook 61 disposed at one inner point of the star-shaped outside tie cord loop, while the eyelets 58 and 60 respectively attached to the other ends of said two cords engage another hook 62 disposed at another inner point of the star-shaped outside tie cord loop diametrically opposed to said one inner point.

Figure 4:
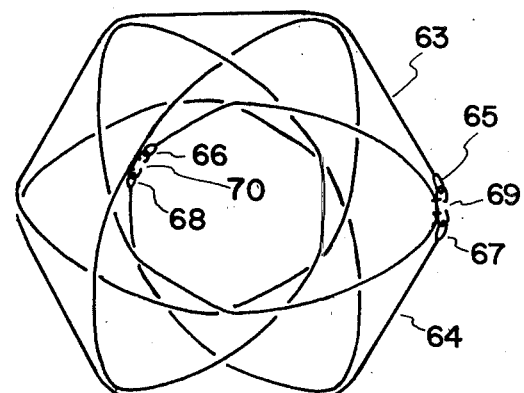

There is shown in FIG. 4 another variation from FIG. 2 wherein said snow chain is constructed of two separate cords 63 and 64 wherein the first pair of eyelets 65 and 67 respectively attached to one end of said two cords engage a hook 69 disposed at one inner point of the star-shaped outside tie cord loop, while the second pair of eyelets 66 and 68 respectively attached to the other ends of said two cords engage a hook 70 disposed at one inner point of the star-shaped inside tie cord loop.

Figure 5:
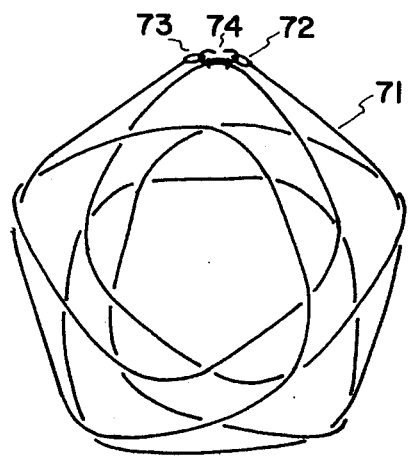

In FIG. 5 there is shown a structurally continuous continuous snow chain with a traction cord loop inlcuding 10 zig-zag runs, which snow chain is constructed of a continuous cord 71 with a pair of eyelets 72 and 73 attached to each end and engaging a hook 74 disposed at one inner point of the star-shaped outside tie cord loop. It is obvious that said snow chain can be constructed by using two or more cords as demonstrated in FIGS. 3 and 4.

Figure 6:
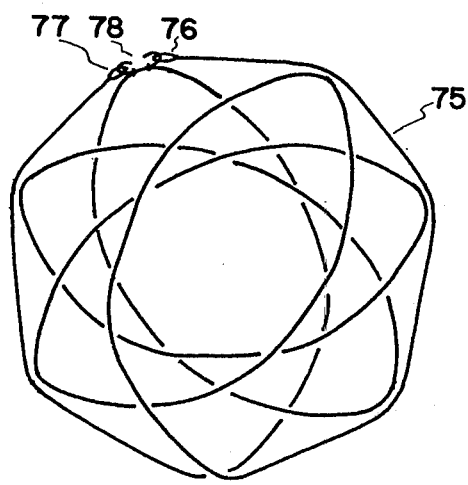

There is shown in FIG. 6 a structurally continuous continuous snow chain with a traction cord loop employing 14 zig-zag runs wherein a cord 75, a pair of eyelets 77 and 76 engaging a hook 78 are employed.

Figure 7:
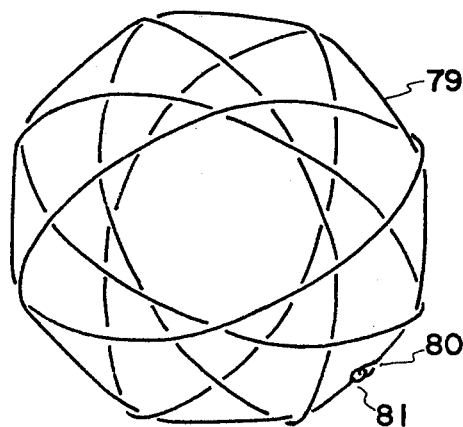

In FIG. 7 there is shown a structurally continuous continuous snow chain with a traction cord loop including 16 zig-zag runs, wherein a cord 79 with an eyelet 81 at one end and a hook 80 at the other end is employed.

Figure 8:
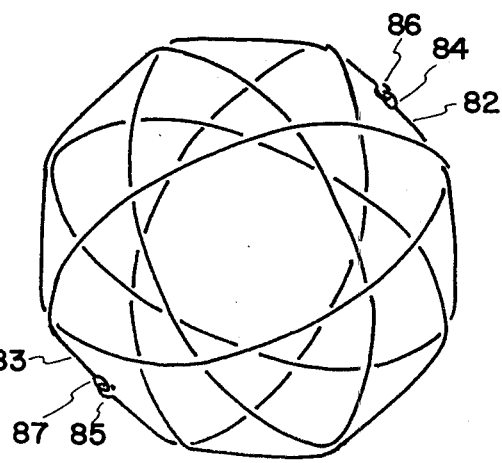

There is shown in FIG. 8 another structurally continuous continuous snow chain with a traction cord loop with 16 zig-zag runs, wherein a pair of cords 82 and 83, each of which respectively has eyelets 84 and 87 at one end and hooks 85 and 86 at the other end are employed.

It is obvious that by using the geometrical schemes or its variations shown in FIGS. 2 through 8, one can construct a structurally continuous continuous snow chain with a traction cord loop having any number of zig-zag runs. It is further obvious that one or more tensioners made of the extension coil spring or elastic bands that is pulling two diametrically located cord segments of the retaining cord loop toward to one another can be used to create an additional tension on the cord segments constituting the structurally continuous continuous snow chain.

While the principles of the invention have now been made clear in an illustrative embodiment, there will be immediately obvious to those skilled in this type of work or those with sharp eyes many modifications of the structures, arrangement, proportions, the elements, materials and components used in the practice of the invention which are particularly adapted for specific environments and operating requirements without departing from those principles.

I claim:

1. A continuous snow chain comprising:
(a) a first star-shaped tie cord loop assembly;
(b) a second star-shaped tie cord loop assembly;
(c) a traction cord loop of a zig-zag pattern having a stretched circumference length slightly greater than the circumference of the tread surface of the tire, each of the first side points of said traction cord loop of zig-zag pattern is connected to each of the outer points of said first star-shaped tie cord loop assembly and each of the second side points of said traction cord loop of zig-zag pattern is connected to each of the outer points of said second star-shaped tie cord loop assembly;
(d) a first retaining cord loop engaging each of the inner points of said first star-shaped tie cord assembly; and
(e) a second retaining cord loop engaging each of the inner points of said second star-shaped tie cord assembly.

2. The combination as set forth in claim 1 wherein said first retaining cord loop and said second retaining cord loop are comprised of extensions of the cords constituting said traction cord loops and said first and second star-shaped tie cord loop assemblies.

3. The combination as set forth in claim 2 wherein said first retaining cord loop is slidably connected to said second retaining cord loop, said first retaining cord loop having one or more adapter means for opening and closing said first retaining cord loop; whereby, closing of said first retaining cord loop contracts both said first and second retaining cord loops.

4. The combination as set forth in claim 2 wherein both said first retaining cord loop and said second retaining cord loop include one or more adapter means for closing and opening of said first and second retaining cord loops.

* * * * *